Nov. 29, 1955  S. P. KISH  2,724,868
METHOD OF MAKING TOOLS AND FIXTURES
Filed Nov. 8, 1951  2 Sheets-Sheet 1

INVENTOR.
Steven P. Kish.
BY
Harness, Dickey & Pierce
ATTORNEYS.

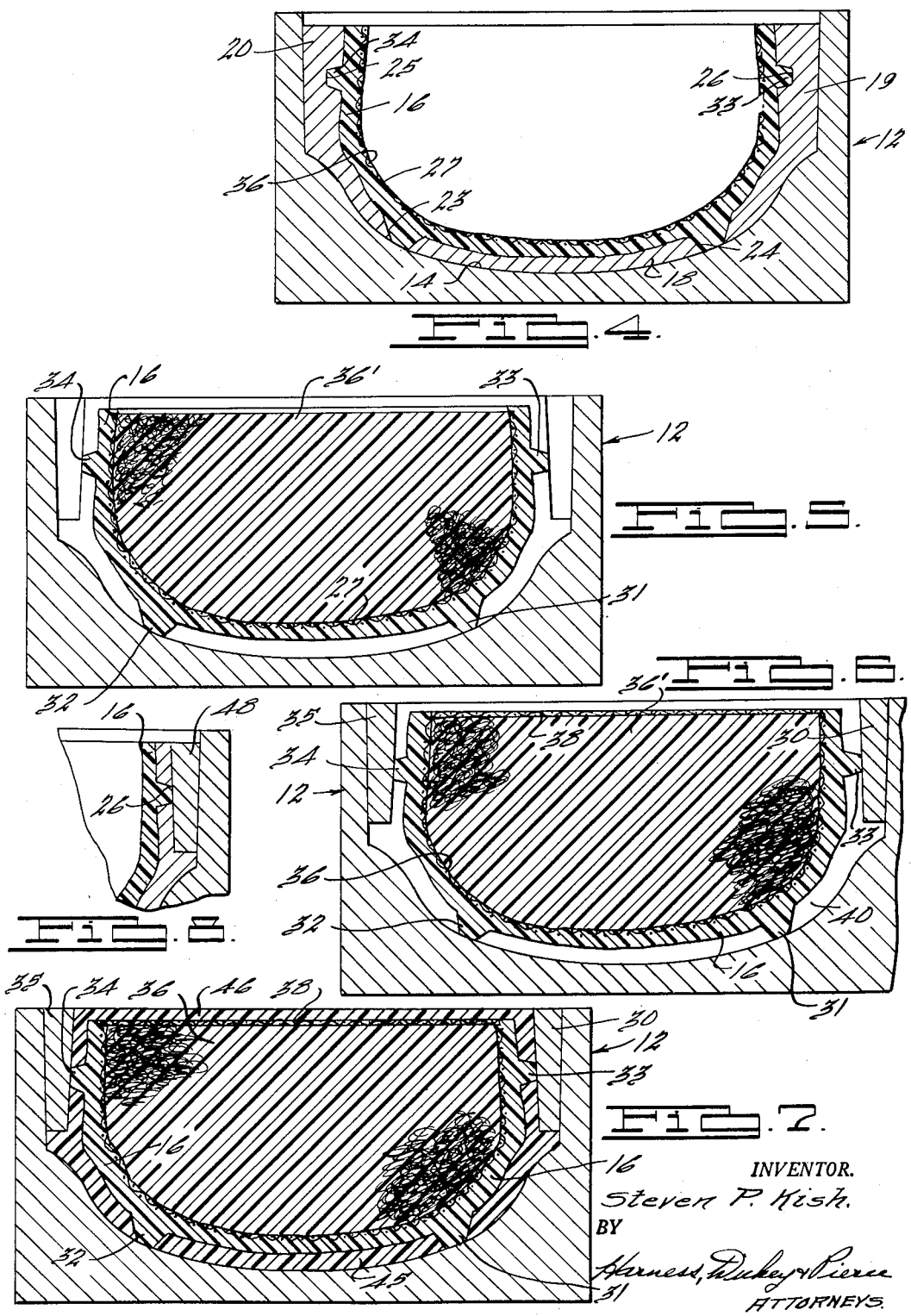

United States Patent Office 2,724,868
Patented Nov. 29, 1955

2,724,868
METHOD OF MAKING TOOLS AND FIXTURES

Steven P. Kish, Lansing, Mich., assignor to Kish Plastic Products, Inc., Lansing, Mich., a corporation of Michigan Application November 8, 1951, Serial No. 255,502

10 Claims. (Cl. 18—59)

The present invention relates to a method of making tools and fixtures and more particularly relates to a method of making tools suitable for use in the fabrication of sheet metal articles.

In the manufacture of sheet metal parts such, for example, as in the automotive industry, the aircraft industry and household hard goods industry, it is well known that a large number of special tools are required such as dies for use in forming sheet-metal parts, assembly fixtures for use in holding fabricated parts properly related with respect to each other while they are connected together in a suitable manner to provide an assembly or subassembly of parts. In addition, other fixtures are required for the purpose of aiding in the making of production dies such as checking features for use in the manufacture of parts, spotting racks for use in checking die surfaces during the manufacture thereof, model duplicates, etc. In the past, master models of the finally designated part have been constructed from a suitable hard wood which has been carefully dried, such as mahogany. From these master models a large number of tools of the above type must then be made using the master models as a pattern. In an effort to reduce the cost of the handmade models, it has been suggested to employ a roughly shaped hard wood core surrounded by a plastic surface having the configuration of the article or a portion thereof. This method is subject to the disadvantage that the resultant model duplicate or template remains subject to the dimensional instability of the hard wood core.

It is therefore one of the objects of this invention to provide a method for making tools and fixtures suitable for use in the fabrication of sheet metal articles which is both simple and economical.

A further object of the invention is to provide a method for making tools and fixtures which have exceptional dimensional stability and resistance to deterioration from the elements.

A still further object of the invention is to provide a method for the production of tools and fixtures which are light in weight, resistant to abrasion and rugged in use.

Other objects and advantageous features of the invention will be specifically mentioned or will become apparent upon consideration of the present disclosure in its entirety.

In the drawings:

Figure 4 is a cross-sectional view of the mold of Figure 3 illustrating another of the steps of the method of this invention;

Figure 5 is a cross-sectional view illustrating still another step of the method of this invention;

Figure 6 is a cross-sectional view illustrating another step of the method of this invention;

Figure 7 is a cross-sectional view illustrating the final step of the method of this invention; and, Figure 8 is a fragmentary sectional view of the mold of Figure 3 showing a modification thereof.

Figure 1:
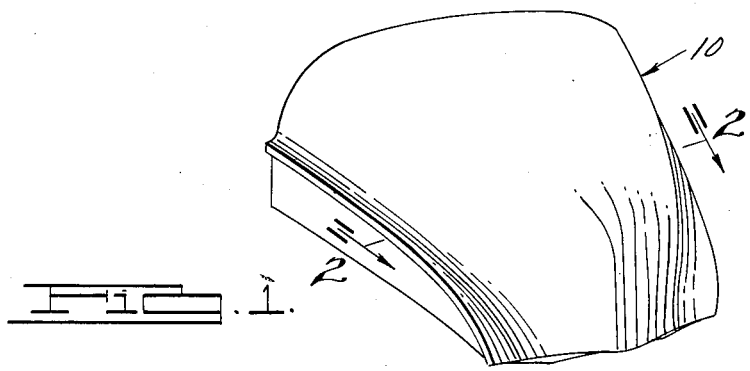
Figure 1 is a perspective view of a model duplicate constructed in accordance with the method of this invention.

In its preferred form, the method of this invention generally comprises the steps of forming an inner supporting shell having the general shape of the three dimensional object to be reproduced, reinforcing the supporting shell with an expanded plastic material having a composition which is compatible with the resin utilized in the supporting shell, and covering the supporting shell with a plastic material to exactly reproduce the configuration of the surface of the article. If desired, further reinforcement may be provided, and with larger production sized models, reinforcement is generally advisable.

The method of this invention may be practiced in connection with the production of model duplicates, templates and some types of checking fixtures, and it is to be understood that the model duplicate 10 illustrated in the drawings is exemplary only. In the practice of the method of this invention, it is first necessary to provide a female mold 12 of the part 10. As may be seen, the configuration of the mold cavity 14 is the same as the external surface form of the model duplicate 10.

Figure 3:
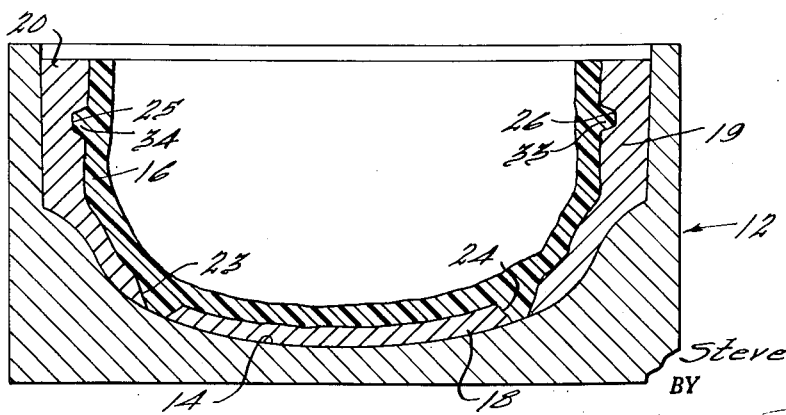
Figure 3 is a cross-sectional view of the mold used in forming the model duplicate of Figure 1 illustrating one of the steps of the method.

In order to produce the inner supporting shell 16, the mold 12 is covered with a layer or layers of a flexible sheet material 18 capable of assuming and retaining the shape of the surface against which it is pressed, by positioning the same on the inner surface of mold cavity 14. Materials such as sheet wax have been found to be suitable for this purpose. The thickness of the sheet wax 18 is determined by the thickness of the plastic surface which subsequently will be supported by shell 16. For the majority of applications, thicknesses varying between about 3/16" and 3/4" are satisfactory and thicknesses between 3/8" and 5/8" are preferred. As may be seen in Figure 3, the thickness of the sheet wax 18 in the particular construction here shown is increased in the upper mold extremities 19 and 20 to enable the subsequent formation of the outwardly projecting flanges 21 and 22. For the purpose of providing integral spacers or spacing projections on the supporting shell 16, the wax 18 is provided with a plurality of spaced apertures 23, 24, 25 and 26 which are distributed more or less uniformly over the surface of the mold 12. It will be observed that the apertures 23, 24 extend completely through the sheet wax 18 and terminate at the inner surface of mold cavity 14. The side apertures 25 and 26, however, project only partially into sheet wax 18 and are adapted to abut removable plugs such as 30, 32 which are required to enable the formation of previously mentioned flanges 21 and 22. It will be appreciated that other methods of spacing the supporting shell 16 may be used and bottom apertures 23, 24 and/or side apertures 25 and 26 may be omitted, if desired.

With the sheet wax 18 properly positioned against the inner surface of mold 12, a viscous, putty-like thermosetting plastic such, for example, as a phenol formaldehyde resin, is spread or paddled on the sheet wax surface and into the apertures 23, 24, 25, 26 thereby forming an inner supporting shell 16 having outwardly projecting spacers 31, 32, 33 and 34. The optimum thickness of the shell 16 is dependent upon the overall size of the tool being fabricated, and in general, thicknesses approximating those specified for the outer layer 18 are satisfactory, that is to say, between about 3/16" and 3/4".

The mold 12, having the liner 16 in place, is then positioned in a curing furnace and the temperature raised therein to approximately 130° to 150° F. and maintained for a period of time sufficient to thoroughly harden and cure the inner shell 16. If desired, a reinforcing screen 27 may be pressed against and imbedded in the viscous inner surface of the shell 16 before the latter has set. The reinforcing screen 27 assumes the shape of the inner surface of the shell 16 and preferably is imbedded only superficially in the inner surface of the plastic shell.

A suitable plastic which is capable of being expanded, in situ, and which is compatible with and capable of chemically bonding to the shell 16 is then poured into the cavity 36 defined by the shell. A suitable material for this purpose is disclosed and claimed in copending, Serial No. 262,478 which was filed December 19, 1951. In general, this material consists of a phenol formaldehyde one stage resin in admixture with a metallic oxide such as ferric oxide, the ferric oxide being present in an amount of approximately 3% to 15%. The expansion of such material is achieved by adding to the resin-metallic oxide constituents a foaming agent comprising mineral acids such as hydrochloric, phosphoric and sulfuric in an aqueous mixture. A typical foaming agent formulation having general utility may comprise equal parts by weight of 66 Baumé sulfuric acid and water. The amount of expansion of the resin is controlled by the proportion of mineral acid foaming agent which is added, and for the purposes of this invention approximately 18–22% by weight of the resin mixture is satisfactory. For some purposes, it is advantageous to include in the composition a proportion of a glycol such as propylene glycol, ethylene glycol, diethylene glycol, etc. The amount of glycol may approximate 15–20% of the foaming agent. Soon after pouring this fluid mixture into the cavity 36, the fluid begins to expand and continues to expand until it fills the entire cavity. The fluid, having constituents in the proportions given, can be expected to expand approximately 2½ to 4 times its fluid volume and simple experimentation will readily determine the exact quantity desired to fill any particular cavity. In the event that an excess of expansible fluid is inserted in the cavity, it will be appreciated that no harm will result inasmuch as any excess of the expanded material 36' can be readily removed after hardening.

As may best be seen in Figure 6, the completely filled cavity 36 may have its upper surface reinforced with wire mesh 38 if desired. With wire mesh 38 in position, the mold 12 is provided with removable plugs 30 and 35 against which spacing members 33 and 34 abut for the purpose of defining the outwardly projecting longitudinally extending flanges 21 and 22.

A suitable thermosetting resin for forming the exterior surface of model duplicate 10 may be selected from any thermosetting resin which is compatible with and will chemically bond to inner shell 16 upon curing. Especially good results have been obtained by employing phenol formaldehyde resins having compositions comparable to the resins employed for inner liner 16. Increases in hardness and increased resistance to wear may be imparted to the exterior surface resin by incorporating therewith a filler material such as ground glass, ferric oxide, a variety of clays such as China clay, etc. Other fillers such as cork, cotton fibers, or wood fibers have a tendency to decrease the hardness and wear resistance, and it will be apparent that the desired balance may be obtained between hardness and wear resistance by adjusting the proportions of these fillers. For purposes of reference, 6 parts asbestos and 3 parts cork when admixed with 100 parts resin and 10 parts foaming agent, as above defined, produces upon curing a Rockwell R hardness of approximately 87–92. The addition of increasing proportions of ground glass or ferric oxide will increase the hardness up to a hardness of about Rockwell R 130. The cured shell 16 is withdrawn from the mold and the wax 18 is removed. The inner surface 13 of the mold 12 is coated with a thin film of a parting compound such as stearic acid or a wax parting compound, and the shell is then replaced in the mold with the projections 31, 32 resting on the inner surface of the mold cavity 14 and spacing the shell 16 therefrom. Care should be taken to insure that the shell 16 is properly centered in the mold. The exterior surface resinous mixture is then poured into the cavity 40 until the cavity is filled as may be seen in Figure 7. External shell 45 may extend around inner shell 16 and wire mesh 38 to provide a completely enclosed solid object composed of three distinct layers integrally bonded together. It will be apparent that external shell 45 may be terminated level with the surface of wire mesh 38 without in any way detracting from the utility of the tool.

The entire mold may then be inserted into a curing oven and the temperature raised to between 130° and 150° F. and maintained for a time period sufficient to completely cure and harden the casting. It will be appreciated that the curing time will vary with the size of the object and for medium sized objects a period of 8–12 hours is usually sufficient. After curing plugs 30 and 32 are removed from the mold, the casting may then be removed by inverting the entire mold 12.

The method of the present invention contemplates the simultaneous curing of the expanded supporting resin 36' and the exterior surface resin 45 but it will be understood that separate curing operations may be used if desired. Furthermore, it will be understood that where raised temperatures of up to 150° F. have been specified for the curing operation that such temperatures serve to speed up the curing time which is required, but that satisfactory curing of the resinous layers may be effected at room temperatures, generally over longer periods of time.

Figure 2:
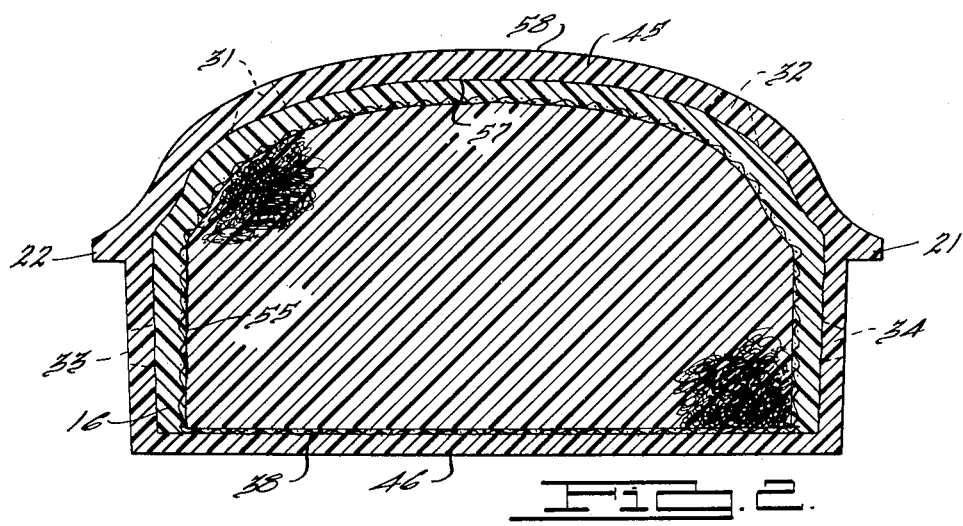
Figure 2 is a sectional view of the model duplicate illustrated in Figure 1 taken substantially on the line 2—2 thereof.

The finished casting illustrated in Figs. 1 and 2 is obtained by inverting the mold 12, and the three layer sandwich type construction may be clearly seen in Fig. 2. The expanded resinous supporting core 36' encircled by reinforcing screens 27 and 38 constitutes the major volume occupying portion of the tool 10 and inasmuch as the weight of core 36 usually varies between approximately 10 and 20 pounds per cu. ft. it will be appreciated that the overall weight of tool 10 is greatly reduced when compared to hitherto known tools designed for comparable purposes. Inner supporting shell 16 having outwardly projecting spacers 33, 34 and upwardly projecting spacers 31, 32 is chemically and physically bonded to core 36 and external shell 45 at the interfaces 55 and 57 respectively. Shells 16 and 45 are, after curing, hard, strong, non-porous, wear resistant members having weights between about 55–85 pounds per cu. ft. and the surface 58 of shell 45 is extremely smooth and free of blemishes or pits. Occasionally it is necessary to polish surface 58 slightly after removing tool 10 from the mold.

As may be seen in Figure 8, the amount of sheet wax which is required in the upper mold cavities 19 and 20 may be varied by the use of a removable plug 48 having the same general shape of plugs 30 and 32.

Various changes and modifications may be required in the mold design, such as the provision of plugs and the like, in order to provide the wide variety of shapes which are required in the production of 3 dimensional articles and these changes will be apparent to those skilled in the art. While only one article has been illustrated and described, it will be appreciated that the method is applicable to any number of articles of varying sizes and shapes and that various omissions, changes and alterations may be made without departing from the spirit and scope of the invention.

What is claimed is:

1. The method of making tools suitable for use in the fabrication of sheet metal articles which comprises the steps of providing a mold of the article to be reproduced, covering the inner surface of the mold with a flexible sheet material, applying a layer of thermosetting plastic on the sheet material, curing the said plastic to form a solid casting, pouring a fluid thermosetting plastic on a surface of the said casting and expanding the said fluid, in situ, to form a porous core at least partially enclosed by and integrally united with said layer of plastic, then removing the casting formed by the core with the plastic layer attached from said mold, stripping away and removing the sheet material from the mold, then replacing the casting in the mold with said plastic layer spaced from the said mold and pouring a fluid thermosetting plastic into the said mold to fill the space between the casting and the walls of the mold, and curing the entire casting.

2. The method of making tools suitable for use in the fabrication of sheet metal articles which comprises the steps of providing a mold of the article to be reproduced, covering the inner surface of the mold with a flexible sheet material, applying a layer of thermosetting plastic on the sheet material, curing said plastic layer to form a hard plastic shell, pouring an expandible fluid thermosetting plastic in said shell, expanding said fluid plastic, in situ, and then curing the same, then removing the shell, stripping away the sheet material, and repositioning the shell with the outer wall of the shell spaced from the inner wall of the mold and casting a fluid thermosetting plastic into the space between the casting and the mold, and then curing said last-mentioned plastic to provide an outer layer on and integrally chemically united with said shell.

3. The method of making tools suitable for use in the fabrication of sheet metal articles, said tools having a sandwich construction consisting of an expanded resinous portion and a shell portion interposed between said expanded portion and an external casing portion, which comprises the steps of providing a mold of an article to be reproduced, covering the surface of the mold with a flexible sheet material, said material having a thickness corresponding approximately to the thickness of the said casing and provided with spaced apertures, applying a layer of viscous thermosetting plastic of substantially uniform thickness over said sheet material and in said apertures whereby the plastic layer forms a shell inside the mold and on said sheet material and the plastic in said apertures forms extensions on the shell which engage the surface of the mold, pressing a reinforcing screen in said shell, curing the said shell to form a solid casting, pouring a fluid thermosetting plastic in said shell and expanding the said plastic in situ to fill said shell, positioning a reinforcing screen on the upper surface of said expanded material, removing the shell with the core therein and said sheet material from the mold, repositioning the shell in the mold with said extensions supporting the shell in the mold, pouring fluid thermosetting plastic into the said mold to fill the space between the shell and the walls of the mold to form a casing, and curing the entire casting and subsequently removing the said casting from the mold.

4. The method of making tools suitable for use in the fabrication of sheet metal articles, said tools having a sandwich construction consisting of an expanded resinous portion and a shell portion interposed between said expanded portion and an external casing portion, which comprises the steps of providing a mold of an article to be reproduced, covering the surface of the mold with a flexible sheet material, said material having a thickness corresponding approximately to the thickness of the said casing and provided with spaced apertures, applying a layer of viscous thermosetting plastic of substantially uniform thickness over said sheet material and in said apertures whereby the plastic layer forms a shell inside the mold and on said sheet material and the plastic in said apertures forms extensions on the shell which engage the surface of the mold, curing said shell to form a solid casting, pouring a fluid thermosetting plastic in said shell and expanding the said plastic in situ to form a core in said shell, removing the shell with the core therein and said sheet material from the mold, repositioning the shell in the mold with said extensions supporting the shell in the mold, pouring fluid thermosetting plastic into the said mold to fill the space between the shell and the walls of the mold to form a casing, and curing the entire casting and subsequently removing the said casting from the mold.

5. The method of making tools suitable for use in the fabrication of sheet-metal articles which comprises the steps of providing a mold of the article to be reproduced, covering the inner surface of the mold with a flexible sheet material, applying a layer of thermosetting plastic on the sheet material, introducing a thermosetting plastic into the mold on said plastic layer and expanding said liquid plastic in situ to form a porous core, then curing the casting formed by the plastic layer and core, removing said casting from the mold and stripping away the sheet material adhering to the mold and to the casting, then replacing the casting in the mold with the plastic layer spaced from said mold, then introducing a liquid thermosetting plastic into the space between the mold and the casting to form an outer casing on the plastic layer, and then curing the plastic material forming said casing.

6. The method of making tools suitable for use for fabrication of sheet-metal articles comprising the steps of providing a mold of the article to be reproduced, covering the surface of the mold with a flexible sheet material having apertures therein, applying a layer of thermosetting plastic on said sheet material and in said apertures, whereby the plastic layer forms a shell inside the mold and on said sheet material and the plastic in said apertures forms extensions on the shell which engage the surface of the mold, then pouring a liquid thermosetting plastic in said shell and expanding the said plastic in situ to form a core in said shell, then curing the shell and core until they are relatively hard and rigid, then removing the shell with the core therein and said sheet material from the mold, repositioning the shell in the mold with said extensions supporting the shell in the mold, pouring fluid thermosetting plastic into said mold to fill the space between the shell and the walls of the mold to form a casing, then curing the plastic material forming said casing, and then removing the casting thus formed from the mold.

7. The method of making tools suitable for use in the fabrication of sheet metal articles comprising the steps of providing a mold of the article to be reproduced, covering the inner surface of the mold with a flexible sheet material, then forming a core in said mold by pouring a liquid thermosetting plastic into the mold cavity and expanding said liquid plastic in situ, then curing the expanded plastic material, then removing said core from the mold and stripping away the plastic sheet material, then replacing said core in the mold cavity with the surface of the core spaced from the surface of the mold cavity, then pouring a liquid thermosetting plastic into the space between the mold and the core to form an outer casing around said core and then curing said casing.

8. The method of making tools suitable for use in the fabrication of sheet-metal articles comprising the steps of providing an open top mold having a mold cavity negatively reproducing the article to be formed, forming a shell on the surface of the mold cavity with the shell material in intimate contact over the entire area thereof with the engaged surface of said cavity so that said shell accurately reproduces the form of the cavity, pouring a liquid thermosetting plastic into said shell and expanding said plastic at atmospheric pressure in situ without stressing or changing the form of the shell to form a porous core at least partially enclosed by and integrally united with said shell, and then curing said plastic material.

9. The method of making tools suitable for use in the fabrication of sheet-metal articles comprising the steps of providing an open top mold having a mold cavity negatively reproducing the article to be formed, applying a layer of thermosetting plastic to the surface of the mold cavity with the plastic material in intimate contact with the engaged surface of the cavity so that said plastic material accurately reproduces the form of said cavity, hardening said plastic layer, pouring a liquid thermosetting plastic into said shell and expanding said liquid plastic at atmospheric pressure in situ without stressing or changing the form of the shell to form a lightweight, essentially strong porous core at least partially enclosed by and integrally united with the plastic material of said plastic layer, and then curing said expanded plastic material.

10. The method of making tools suitable for use in the fabrication of sheet-metal articles comprising the steps of providing an open top mold of the article to be reproduced, forming a core in said mold by pouring a liquid thermosetting plastic into the mold cavity and expanding said liquid plastic at atmospheric pressure in situ, curing the expanded plastic material, removing the cured plastic core from the mold, replacing said core in the mold cavity with the surface of the core spaced from the surface of the mold cavity, pouring a liquid thermosetting plastic into the space between the mold and the core to form an outer casing on said core, curing said casing, and then removing the core and casing from said mold.

References Cited in the file of this patent

UNITED STATES PATENTS

| | | |
|---|---|---|
| 696,352 | Richards | Mar. 25, 1902 |
| 2,189,154 | Stewart | Feb. 6, 1940 |
| 2,313,985 | Bradshaw | Mar. 16, 1943 |
| 2,460,242 | Renaud | Jan. 25, 1949 |
| 2,516,091 | Renaud | July 18, 1950 |
| 2,632,922 | Kish | Mar. 31, 1953 |